(12) United States Patent
Nagasawa

(10) Patent No.: US 9,280,154 B2
(45) Date of Patent: Mar. 8, 2016

(54) VEHICLE SYSTEM AND VEHICLE CONTROL METHOD

(71) Applicant: MURATA MACHINERY, LTD., Kyoto-shi, Kyoto (JP)

(72) Inventor: Atsuo Nagasawa, Inuyama (JP)

(73) Assignee: MURATA MACHINERY, LTD., Kyoto (JP)

(*) Notice: Subject to any disclaimer, the term of this patent is extended or adjusted under 35 U.S.C. 154(b) by 231 days.

(21) Appl. No.: 13/742,387

(22) Filed: Jan. 16, 2013

(65) Prior Publication Data

US 2013/0197719 A1 Aug. 1, 2013

(30) Foreign Application Priority Data

Jan. 27, 2012 (JP) ................................. 2012-015471

(51) Int. Cl.
*B61L 3/08* (2006.01)
*G05D 1/00* (2006.01)
*B61L 27/00* (2006.01)
*G05D 1/02* (2006.01)

(52) U.S. Cl.
CPC .......... *G05D 1/0027* (2013.01); *B61L 27/0038* (2013.01); *G05D 1/0297* (2013.01)

(58) Field of Classification Search
None
See application file for complete search history.

(56) References Cited

U.S. PATENT DOCUMENTS

| 5,420,883 | A | * | 5/1995 | Swensen et al. | 375/138 |
| 7,050,890 | B2 | * | 5/2006 | Tolmei | 701/20 |
| 7,201,350 | B2 | * | 4/2007 | Sugita et al. | 246/122 R |
| 8,135,496 | B2 | * | 3/2012 | Hayashi | 700/229 |
| 8,725,325 | B1 | * | 5/2014 | Nishinaga et al. | 701/20 |
| 2005/0133673 | A1 | * | 6/2005 | Sugita et al. | 246/167 R |
| 2010/0228389 | A1 | * | 9/2010 | Hayashi | 700/229 |
| 2010/0286845 | A1 | * | 11/2010 | Rekow et al. | 701/2 |
| 2011/0108677 | A1 | * | 5/2011 | Asuka et al. | 246/27 |
| 2014/0209752 | A1 | * | 7/2014 | Myokei | 246/27 |

FOREIGN PATENT DOCUMENTS

JP 4798554 B2 10/2011

* cited by examiner

*Primary Examiner* — Redhwan K Mawari
*Assistant Examiner* — Edward Torchinsky
(74) *Attorney, Agent, or Firm* — Keating & Bennett, LLP

(57) ABSTRACT

In a vehicle system, an inter-vehicle distance between vehicles is controlled by periodically reporting vehicle statuses from a plurality of vehicles to a ground controller and also periodically sending travelling instructions to the plurality of vehicles from the ground controller. Each vehicle stops when detecting failed reception of an instruction from the ground controller and reporting a vehicle status including information that the vehicle has stopped to the ground controller, and the ground controller based on the report received from the stopped vehicle sends a travelling instruction to the stopped vehicle, and based on the report received from the stopped vehicle, also sends a travelling instruction to a vehicle that follows the stopped vehicle so as to avoid interference with the stopped vehicle.

10 Claims, 5 Drawing Sheets

F I G. 1
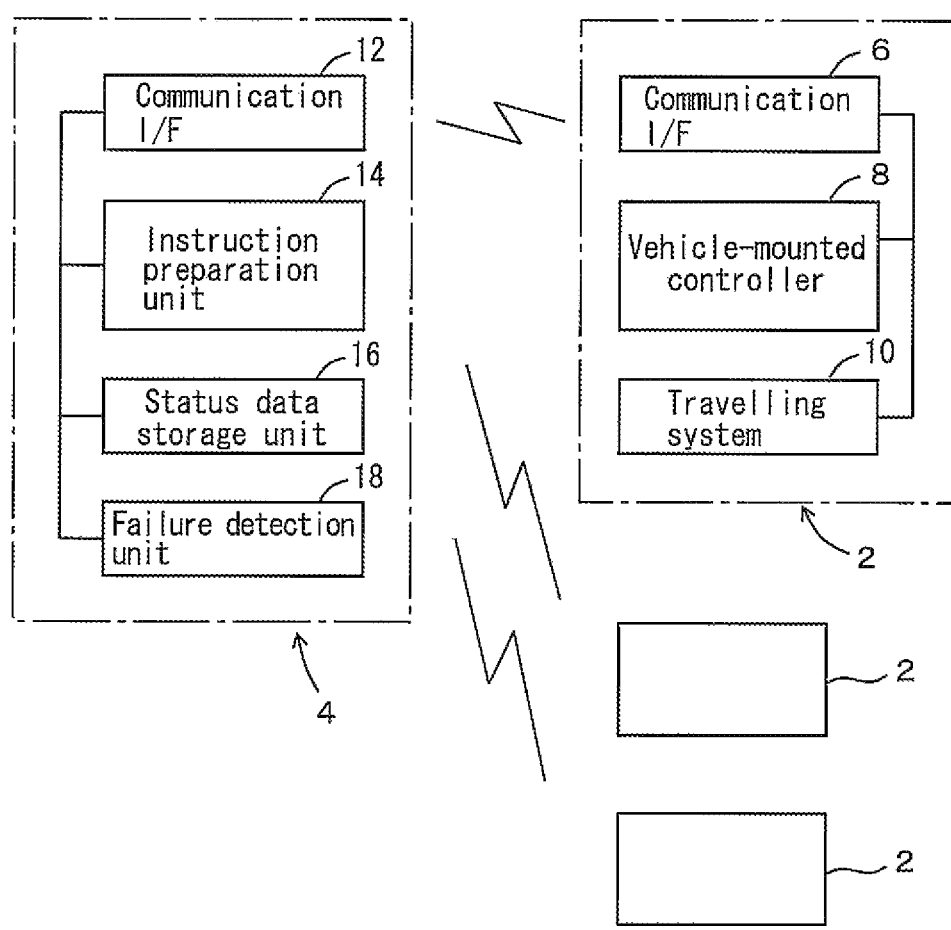

VEHICLE SYSTEM AND VEHICLE CONTROL METHOD

BACKGROUND OF THE INVENTION

1. Field of the Invention

The present invention relates to a vehicle system, and in particular, avoidance of interference between vehicles.

2. Description of the Related Art

In a vehicle system, each vehicle is provided with an obstacle sensor or the like to detect other preceding vehicles. See, for example, Japanese Patent No. 4399739. However, even when such an obstacle sensor does not detect any other vehicle, the possibility that this detection result is not correct cannot be denied.

In Japanese Patent No. 4798554, a plurality of vehicles periodically report their vehicle statuses to a ground controller, and the ground controller periodically sends travelling instructions to the plurality of vehicles in order to control the inter-vehicle distance. However, Japanese Patent No. 4798554 does not take into consideration a communication failure between the vehicle and the controller.

SUMMARY OF THE INVENTION

Preferred embodiments of the present invention provide a vehicle system that does not rely on an obstacle sensor or the like and with which inter-vehicle interference does not occur even when there is a communication failure between a controller and a vehicle.

Preferred embodiments of the present invention also provide a vehicle system that can be promptly restored when communication returns to normal.

According to a preferred embodiment of the present invention, a vehicle system for controlling inter-vehicle distances between vehicles by periodically reporting vehicle statuses from a plurality of vehicles to a ground controller and periodically sending travelling instructions from the ground controller to the plurality of vehicles includes a ground controller, and a plurality of vehicles provided with a communication unit for communication with the ground controller configured and programmed to detect failed reception of an instruction from the ground controller and produce a vehicle stop signal and also report to the ground controller a vehicle status including information that the vehicle has stopped, wherein the ground controller is configured and programmed to send a travelling instruction to the stopped vehicle, and based on the report received from the stopped vehicle, also send a travelling instruction to a vehicle that follows the stopped vehicle, so as to avoid interference with the stopped vehicle.

Also, according to another preferred embodiment of the present invention, a vehicle control method in a vehicle system for controlling inter-vehicle distances between vehicles by periodically reporting vehicle statuses from a plurality of vehicles to a ground controller and also periodically sending travelling instructions from the ground controller to the plurality of vehicles includes a step for making a vehicle stop when detecting failed reception of an instruction from the ground controller and also reporting to the ground controller a vehicle status including information that the vehicle has stopped, and a step for making the ground controller send a travelling instruction to the stopped vehicle, and based on the report received from the stopped vehicle, also sending a travelling instruction to a vehicle that follows the stopped vehicle, so as to avoid interference with the stopped vehicle.

In various preferred embodiments of the present invention, a vehicle stops when not receiving a travelling instruction from a controller, and safety is thus ensured. Also, the stopped vehicle continues reporting to the controller, and thus the status, such as location and velocity, of the stopped vehicle is clear to the controller, and sending an appropriate travelling instruction to the following vehicle makes it possible to avoid interference with the stopped vehicle. Moreover, based on the report from the stopped vehicle, the ground controller also sends a travelling instruction to the stopped vehicle, and thus the system can be easily restored when communication returns to normal. The travelling instruction provided to the stopped vehicle is, for example, the next target velocity, and is an instruction that requests the stopped vehicle to resume travelling in accordance with the instruction from the ground controller. The instruction to the following vehicle is an instruction to slow down, stop, or the like.

Note that, in this specification, the description of the vehicle system is also applicable to the vehicle control method, and the description on the vehicle control method is also applicable to the vehicle system. To describe the correspondence between the preferred embodiments and the claims, the communication unit of the vehicle preferably corresponds to a communication interface 6 in the preferred embodiments or to a combination of the communication interface 6 and a vehicle-mounted controller 8, and the actual stopping operation preferably is executed by the vehicle-mounted controller 8 in accordance with the instruction from the communication interface. Also, the processing of the ground controller preferably is executed by a communication interface 12, instruction preparation unit 14, status data storage unit 16, and failure detection unit 18 in collaboration.

Preferably, the ground controller detects failed reception of a report from a vehicle and instructs the vehicle from which the ground controller did not receive a report and a following vehicle to stop. In this way, the vehicle whose status, such as location and velocity, has become unclear because a report was not received is stopped, thus making it possible to prevent interference with another vehicle, and the following vehicle is also stopped, thus making it possible to prevent interference with the vehicle whose status has become unclear.

Also, preferably, the stopped vehicle resumes travelling once a travelling instruction is received from the ground controller. In this way, the vehicle system is automatically restored when a travelling instruction is received.

Preferably, the communication unit periodically reports at least a vehicle location to the ground controller, and the ground controller identifies a vehicle that follows the stopped vehicle from the reported locations of the plurality of vehicles. This makes it possible to easily identify the following vehicle from the reported locations.

Particularly preferably, the communication unit periodically reports, in addition to the vehicle location, a point to be passed through on a travel path to the ground controller, and the ground controller identifies the vehicle that follows the stopped vehicle from, in addition to the reported locations, the reported points to be passed through on the travel path. In this way, reporting a merging section of travel paths or the like as a point to be passed through makes it possible to easily identify the following vehicle.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 1 shows a block diagram for a ground controller and vehicles in a preferred embodiment of the present invention.

DETAILED DESCRIPTION OF THE PREFERRED EMBODIMENTS

Figure 2:
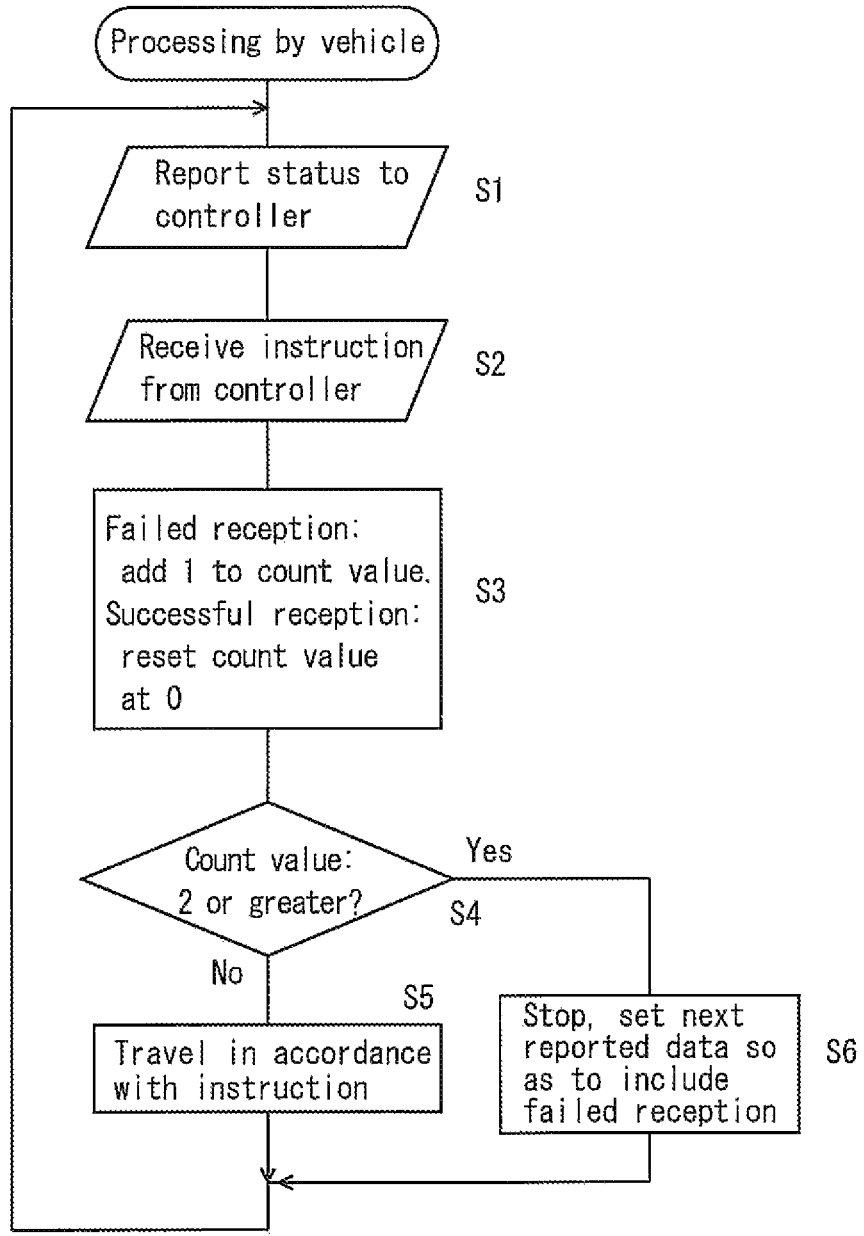
FIG. 2 is a flowchart showing processing performed by a vehicle.

The following describes preferred embodiments of the present invention. The scope of the present invention is based on the claims, and is intended to be determined in accordance with the understanding of a person skilled in the art with reference to the description of preferred embodiments of the present invention and related art in the field of the present invention.

FIGS. 1 to 5 show preferred embodiments of the present invention. In the figures, reference numeral 2 denotes a vehicle, such as an overhead travelling vehicle, auto-guided vehicle, stacker crane or rail guided vehicle, for example, which travels along a predetermined travel path in accordance with the instruction from a ground controller 4. The vehicle 2 transports cargo and may be or may not be equipped with a transfer device. The vehicle 2 communicates with the communication interface 12 of the ground controller 4 (hereinafter simply referred to as the "controller 4") via the communication interface 6, reports the status of the vehicle 2 with a cycle of, for example, 1 msec to 1 sec, and receives an instruction from the controller 4.

The communication interface 6 monitors the status of communication with the controller 4, and adds a count value of 1 when reception of an instruction from the controller 4 fails, and resets the count value to 0 when an instruction is received. Other than this, the communication interface 6 may be used to evaluate the state of communication with the controller also by monitoring whether or not an acknowledgement signal (Ack signal) in response to a report sent to the controller 4 has been successfully received. The vehicle-mounted controller 8 controls the entire vehicle 2, and controls a travelling system 10 that preferably includes, for example, a motor and wheels in accordance with the instruction from the controller 4. Other than this, the vehicle 2 may be provided with, for example, an obstacle sensor that monitors a preceding vehicle or the like.

The controller 4 stores the status of each vehicle 2 in the status data storage unit 16. Examples of the status include location, velocity, destination, a series of velocity control points VCPs through which the vehicle passes before reaching the destination and their IDs, IDs of velocity control points VCPs through which the vehicle has already passed and times when the vehicle passed, the ID of a transfer instruction currently performed, and information indicating that the vehicle is travelling, stopping, picking up cargo, or dropping off cargo. Note that the velocity control point is a point where the target velocity of the vehicle 2 is changed and where the vehicle 2 starts accelerating or decelerating to the target velocity. The velocity control at the velocity control point is velocity control that is performed for a duration longer than one communication cycle. Moreover, a required travelling time between velocity control points is, in principle, longer than one communication cycle. A plurality of velocity control points may be provided along a travel path and divide the travel path into a plurality of sections. The status data storage unit 16 stores the communication status of each vehicle 2, and adds a count value of 1 when reception of a report from the vehicle 2 fails, and resets the count value to 0 when a report is received. Moreover, the status data storage unit 16 may be used to evaluate the state of communication by monitoring whether or not an acknowledgement signal (Ack signal) in response to an instruction sent to the vehicle 2 has been successfully received. Note that monitoring the status of communication may be performed not by the vehicle state storage unit 16 but by the communication interface 12, for example.

The instruction preparation unit 14 prepares in every cycle, for example, an instruction to be performed by the vehicle 2 in the next cycle, and sends it from the communication interface 12. For example, an instruction preferably includes the ID of the velocity control point (hereinafter simply referred to as a "VCP") that will be passed through next and the target velocity achieved at the end of the next cycle, and other than these, an instruction may order a stop, cargo-pickup, cargo-dropoff, or the like. The target velocity preferably is a velocity that satisfies three conditions, i.e., an inter-vehicle distance to the preceding vehicle, a velocity limit that is dependent on the location on the travel path, the velocity that allows the vehicle to stop at the destination, and also that can be attained by acceleration or deceleration from the current velocity within 1 cycle. Which vehicle is a preceding vehicle becomes clear from the VCP through which the vehicle 2 passes, and the inter-vehicle distance becomes clear from the location of the preceding vehicle. The upper limit velocity relevant to the inter-vehicle distance is determined such that the vehicle can stop so as to leave a specific space behind the preceding vehicle when the preceding vehicle comes to a stop at maximum deceleration.

The failure detection unit 18 detects a vehicle that has a count value of, for example, 2 or greater in the status data storage unit, and sends the ID of such a vehicle to the instruction preparation unit. This vehicle is a vehicle that did not report to the controller 4 its status in, for example, 2 or more successive cycles, and the instruction preparation unit 14 prepares an instruction to stop this vehicle and sends it from the communication interface 12. Also, the instruction preparation unit 14 sends a stop instruction to the following vehicle that follows the vehicle to which the aforementioned stop instruction is given. Which vehicle is the following vehicle becomes clear from, for example, the IDs of the already passed VCPs or the reported vehicle locations. However, if there is a sufficient inter-vehicle distance to the following vehicle, it is not necessary to instruct the following vehicle to stop.

In the present preferred embodiment, the controller 4 preferably is shown as one server, but the controller 4 may include a plurality of computers such as a host computer and a controller that is provided in each zone and that relays communication with the vehicle 2, for example. Also, the controller 4 communicates with a host controller (not shown), receives an instruction of, for example, a transfer request from the host controller, and reports, for example, a transfer result.

Figure 3:
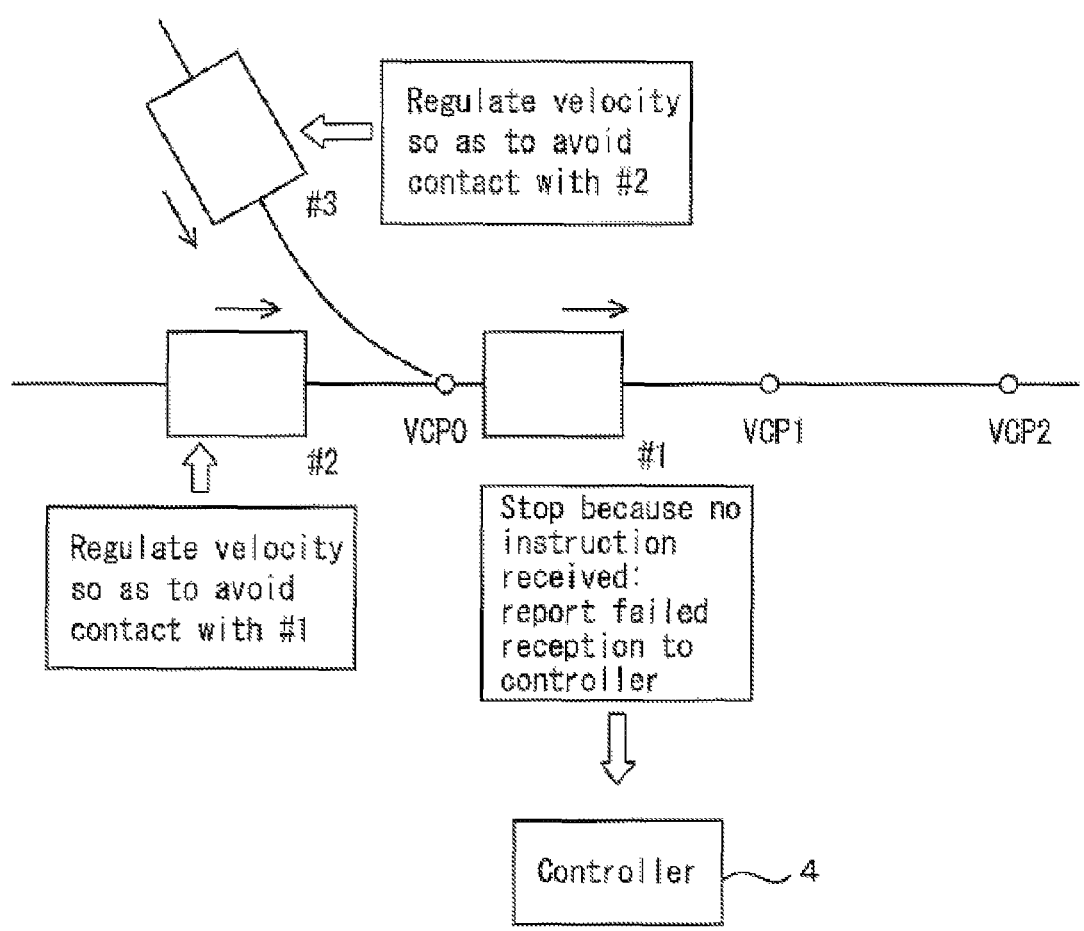
FIG. 3 is a diagram showing processing performed when the vehicle does not receive an instruction from the ground controller.

FIGS. 2 and 3 shows processing performed when the vehicle 2 did not receive an instruction from the controller 4. Reference numerals #1 to #3 in FIG. 3 denote vehicles, a merging section is provided on the travel paths, and velocity control points VCP0 to VCP2 are set. Each vehicle 2 reports to the controller 4, in every cycle, data showing, for example, the location, velocity, ID of VCP through which the vehicle will pass, destination, and information indicating that the vehicle is travelling, stopping, picking up cargo, or dropping off cargo as the status of the vehicle 2 (step S1). Note that the status of the vehicle 2 includes data indicating at least the location of the vehicle. An instruction from the controller is received in step S2, and a count value of 1 is added when reception fails, and the count value is reset to 0 when reception is successful (step S3). The communication interface of the vehicle 2 detects that the count value has become 2 or greater, and sends a stop signal to the vehicle-mounted controller. As a result, the vehicle 2 comes to a stop by itself, for example, at maximum deceleration, and sets data that will be reported in the next cycle such that the vehicle has stopped due to failed reception (step S4). Otherwise, the vehicle travels in accordance with the instruction (step S5). Note that monitoring of the count value may be performed by the vehicle-mounted controller.

For example, in the situation depicted in FIG. 3, vehicle #1 stops because vehicle #1 did not receive an instruction from the controller 4 in two successive cycles. In this connection, a report that the vehicle has stopped due to reception failure is sent to the controller 4 in the next cycle. The instruction preparation unit of the controller 4 can recognize from the location and velocity of each vehicle that vehicle #2 follows vehicle #1, and vehicle #3 follows vehicle #2 because vehicle #3 passes through the velocity control point VCP0 later than vehicle #2 does. The instruction preparation unit of the controller 4, in the case where the report from vehicle #1 has been successfully received and the location has become clear, makes a velocity instruction such that the following vehicle #2 avoids interference with vehicle #1. In the case where reception of a report from vehicle #1 fails, the location of vehicle #1 is not clear and thus an instruction is given to vehicle #2 to stop. Because the location of vehicle #2 is stored in the status data storage unit of the controller 4, an instruction is given to vehicle #3 so as to avoid interference with vehicle #2.

Accordingly, vehicle #1 does not travel without obeying the instruction of the controller 4, and interference between vehicles #1 and #2 can be avoided also. The stopped vehicle #1 or the like periodically reports to the controller 4 data such as the location of stopping, the reason of stopping (for example, failed reception of an instruction or occurrence of mechanical failure), and the controller 4 periodically sends a travelling instruction to the stopped vehicle #1 or the like. Vehicle #1 or the like resumes travelling once receiving this instruction. The travelling instruction given to vehicle #1 or the like is prepared in accordance with the location of stopping, the reason of stopping, the inter-vehicle distances from the vehicles in front and rear, and the like. For example, an instruction specifying the target velocity at the end of the next cycle and the next velocity control point to be passed through is given to vehicle #1. An instruction ordering to stop or specifying the target velocity at the end of the next cycle and the next velocity control point to be passed through is given to vehicle #2 in accordance with the inter-vehicle distance from vehicle #1.

Figure 4:
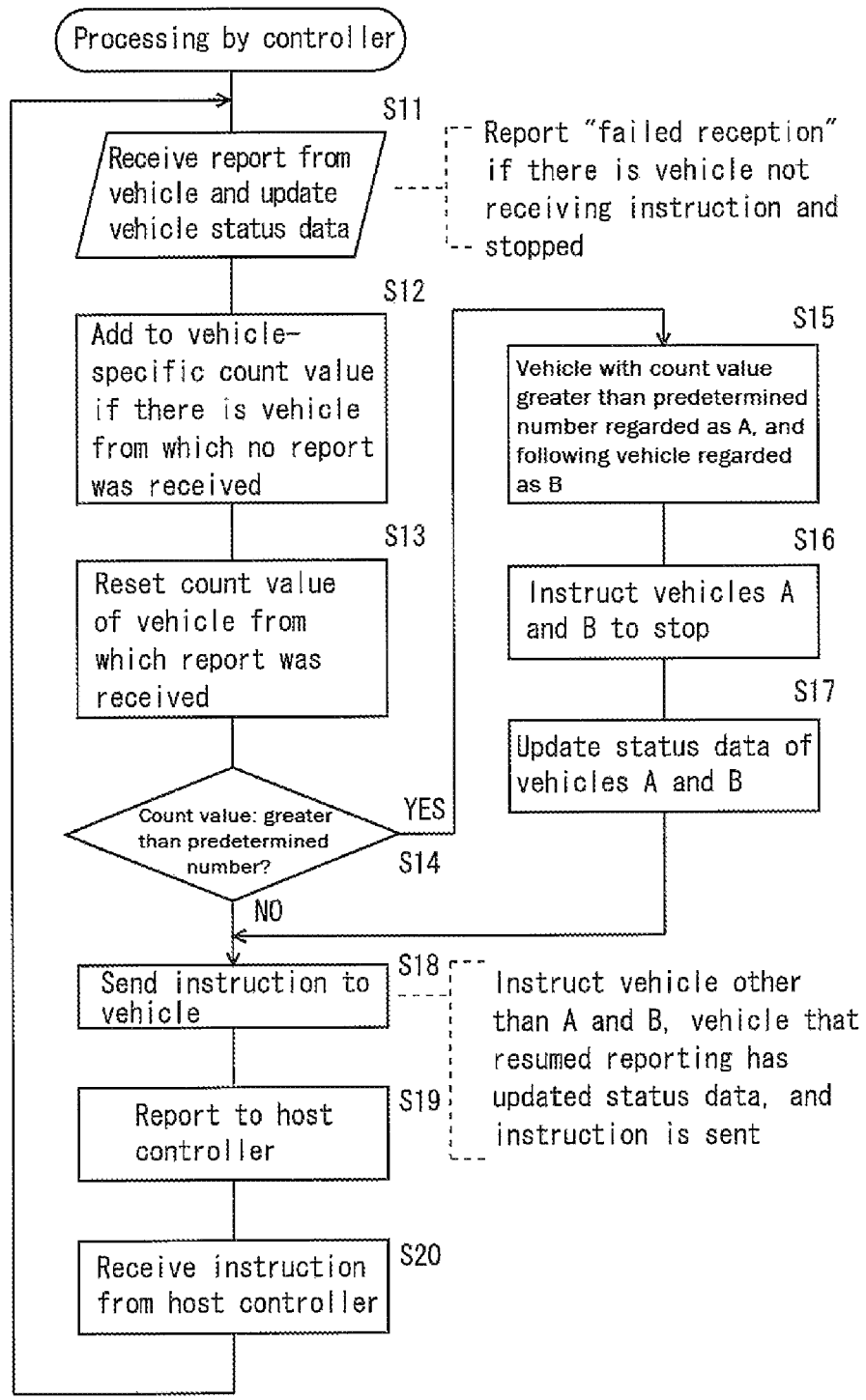
FIG. 4 is a flowchart showing processing performed by the ground controller.
Figure 5:
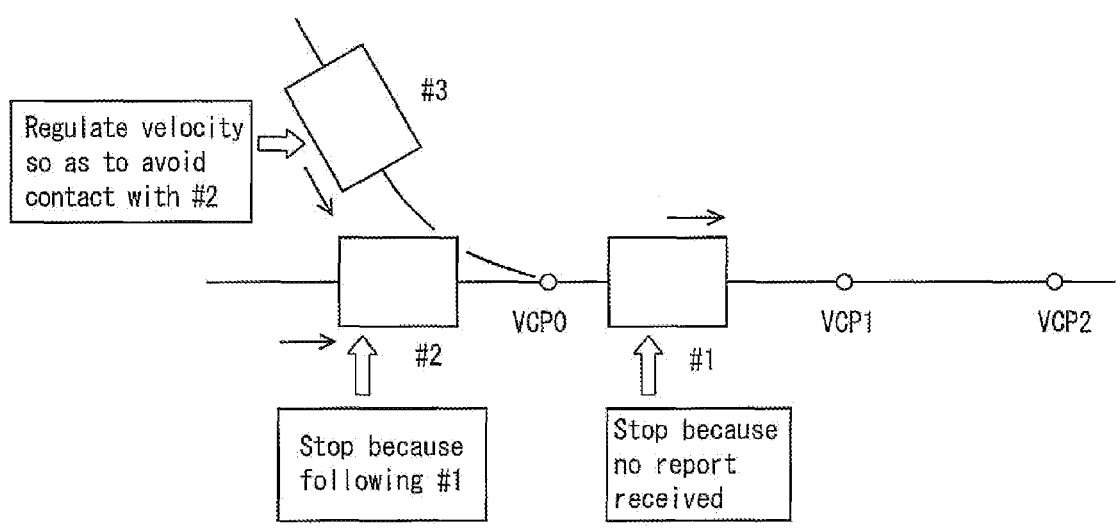
FIG. 5 is a diagram showing processing performed when the ground controller does not receive a report from the vehicle.

FIGS. 4 and 5 show processing performed by the controller 4. A report from a vehicle is received in step S11, and the status data of the vehicle is updated. At this time, if there is a vehicle that fails to receive an instruction and stops according to the procedure of FIGS. 2 and 3, a report that the vehicle has stopped due to reception failure is made. If there is a vehicle from which no report was received, 1 is added to the count value of the vehicle, and when a report is received, the count value of the vehicle is reset to 0 (steps S12 and S13).

With A denoting a vehicle having a count value greater than a predetermined number (for example, 2) and B denoting the following vehicle, an instruction is given to the vehicles A and B to stop, and their statuses are changed from travelling to stopping (steps S14 to S17). If there is a similar vehicle other than the vehicles A and B, an instruction to stop is given in a similar manner, and the controller periodically sends a travelling instruction indicating "stop" also to the stopped vehicles. An ordinary instruction is sent to vehicles other than these (step S18). Here, when a report is successfully received from a vehicle that has been stopped because reception of a report failed in two or more successive cycles, the count value is reset to 0 in step S13, and the location and velocity become clear from the report, and thus the next instruction is sent to the vehicle and the following vehicle in step S18, and a recovery from communication failure is achieved. Other than this, the controller provides a report to the host controller (not shown) and receives an instruction therefrom (steps S19 and S20).

FIG. 5 shows the content of the processing, and the arrangement of travel paths and vehicles is as shown in FIG. 3. The controller instructs vehicle #1 to stop because reception of a report failed in two or more successive cycles. Because vehicle #2 follows vehicle #1 and the location of vehicle #1 has become unclear, the controller instructs vehicle #2 to stop. Because the location of vehicle #2 is stored in the status data storage unit of the controller 4, the controller 4 instructs vehicle #3 to have a velocity so as to maintain the inter-vehicle distance to vehicle #2. A travelling instruction is periodically sent to vehicles #1 and #2 from the controller even after the vehicles have stopped, and the controller instructs to "stop" until the controller receives a report from vehicle #1, and once the controller receives a report, the controller instructs to resume travelling in accordance with the locations or the like of vehicles #1 and #2.

Regarding FIGS. 2 to 5, in the case where the communication between the controller and a vehicle is completely lost, the vehicle stops by itself as in FIGS. 2 and 3, and the following vehicle stops by an instruction from the controller as in FIGS. 4 and 5.

In the present preferred embodiment, a vehicle stops preferably when reception fails in two successive cycles, but the vehicle may stop when reception fails even in one cycle, or when reception fails in 3 or more successive cycles, for example. Also, if an acknowledge signal Ack that acknowledges reception of a report to the controller 4 or reception of an instruction from the controller is not obtained, the communication status can be estimated accordingly. Therefore, this may be included in the detection of communication failure.

Note that providing a time period that is reserved for emergency communication, in addition to the time periods to provide the aforementioned instruction and report, within a communication cycle to report that communication has not been received makes it possible to, for example, increase the opportunity to resend an instruction or a report or more promptly give a stop instruction. In the present preferred embodiment, an instruction for the target velocity in the next cycle is provided, but the inter-vehicle distance may be controlled by specifying an allowable range of travelling by, for example, a velocity-control point or an exclusive control point. In any case, there is a significance in not maintaining the received target speed but immediately stopping the vehicle as well as in not travelling the received allowable travelling range but immediately stopping the vehicle when an instruction from the controller is not received in two or more successive cycles.

Although overhead travelling vehicles, auto-guided vehicles, and the like travel through the same location on a path in one direction, stacker cranes travel on the same rail in both directions. Thus, in the case of stacker cranes, in step S16 of FIG. 4, not only an instruction is provided to the following stacker crane to stop, but also an instruction to stop is provided to a stacker crane that is travelling in the opposite direction toward the stacker crane from which no report was received.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vehicle system for controlling inter-vehicle distances between vehicles by periodically reporting vehicle statuses from a plurality of vehicles to a ground controller and also periodically sending travelling instructions from the ground controller to the plurality of vehicles, the vehicle system comprising:
    a ground controller configured and programmed to store a vehicle-specific count value assigned to each of the plurality of vehicles;
    a plurality of vehicles each provided with a communication unit arranged to communicate with the ground controller; wherein
    the communication unit of each of the plurality of vehicles is configured and programmed to periodically report a vehicle status including at least a vehicle location to the ground controller in every communication cycle of the vehicle system;
    in response to the ground controller receiving a report from one of the plurality of vehicles, the ground controller is configured and programmed to reset the vehicle-specific count value to zero;
    in response to the ground controller failing to receive a report from one of the plurality of vehicles, the ground controller is configured and programmed to add to the vehicle-specific count value;
    in response to a first vehicle of the plurality of vehicles failing to receive an instruction from the ground controller, the communication unit of the first vehicle is configured and programmed to detect failed reception of the instruction from the ground controller, produce a vehicle stop signal that stops the first vehicle, and report to the ground controller the vehicle status including information that the first vehicle has stopped;
    the ground controller is configured and programmed to send a travelling instruction to the stopped first vehicle, and based on the report received from the stopped first vehicle, send a travelling instruction to a second vehicle that follows the stopped first vehicle, so as to avoid interference with the stopped first vehicle;
    in response to the ground controller receiving a report from the first vehicle that the first vehicle has stopped, the ground controller is configured and programmed to periodically send a travelling instruction to the stopped first vehicle to resume travelling; and
    in response to the ground controller failing to receive a report from the first vehicle and the vehicle-specific count value of the first vehicle being greater than a predetermined number, the ground controller is configured and programmed to periodically instruct the first vehicle and the following second vehicle to stop and to update the vehicle status information of the first vehicle and the second vehicle, until the ground controller receives the vehicle status information from the first vehicle including at least the vehicle location, and then to send the travelling instruction to the stopped first vehicle to resume travelling once the vehicle status information from the first vehicle including at least the vehicle location has been received.

2. The vehicle system according to claim 1, wherein the stopped first vehicle resumes travelling once the travelling instruction is received from the ground controller.

3. The vehicle system according to claim 1, wherein:
    the ground controller is configured and programmed to identify the second vehicle that follows the stopped first vehicle from the reported locations of the plurality of vehicles.

4. The vehicle system according to claim 3, wherein:
    the communication unit is configured and programmed to periodically report, in addition to the vehicle location, a point to be passed through on a travel path to the ground controller; and
    the ground controller is configured and programmed to identify the second vehicle that follows the stopped first vehicle from, in addition to the reported locations, the reported points to be passed through on the travel path.

5. The vehicle system according to claim 1, wherein the ground controller is further programmed and configured to send a traveling instruction to a third vehicle that follows the second vehicle to instruct the third vehicle to move with a velocity that maintains a predetermined inter-vehicle distance relative to the second vehicle.

6. The vehicle system according to claim 5, wherein the predetermined inter-vehicle distance is controlled by setting an allowable range of traveling by a velocity-control point or an exclusive control point.

7. The vehicle system according to claim 1, wherein the ground controller is further programmed and configured to send the traveling instruction to the second vehicle so as to avoid contact between the first vehicle and the second vehicle.

8. The vehicle system according to claim 1, wherein interference with the stopped first vehicle is defined by contact between the first vehicle and the second vehicle.

9. The vehicle system according to claim 1, wherein the predetermined number is two.

10. A vehicle control method in a vehicle system for controlling inter-vehicle distances between vehicles by periodically reporting vehicle statuses including at least vehicle location information from a plurality of vehicles to a ground controller in every communication cycle of the vehicle system and also periodically sending travelling instructions from the ground controller to the plurality of vehicles, the method comprising:
    stopping a first vehicle when detecting failed reception of an instruction from the ground controller or failed reception of a report to the ground controller;
    reporting to the ground controller a vehicle status including information that the first vehicle has stopped; and
    sending, by the ground controller, a travelling instruction to the stopped first vehicle, and, based on the report or the failed reception of the report from the stopped first vehicle, sending a travelling instruction to a second vehicle that follows the stopped first vehicle, so as to avoid interference with the stopped first vehicle; wherein
    in response to the ground controller receiving a report from the first vehicle, resetting a vehicle-specific count value assigned to the first vehicle to zero;
    in response to the ground controller failing to receive a report from the first vehicle, adding to the vehicle-specific count value;
    in response to successful transmission of a report from the first vehicle to the ground controller that the first vehicle has stopped, periodically sending a traveling instruction from the ground controller to the first vehicle to resume travelling; and in response to a failed transmission of a report from the first vehicle to the ground controller and the vehicle-specific count value being greater than a predetermined number, periodically instructing the first vehicle and the following second vehicle to stop and updating the vehicle status information of the first vehicle and the second vehicle, wherein a reception by the ground controller of the vehicle status information from the first vehicle includes at least the vehicle location, and then sending the travelling instruction to the stopped first vehicle to resume travelling once the vehicle status information from the first vehicle including at least the vehicle location has been received.

* * * * *